United States Patent
Patel et al.

(10) Patent No.: US 10,970,738 B2
(45) Date of Patent: Apr. 6, 2021

(54) METADATA BASED GENERATION AND MANAGEMENT OF EVENT PRESENTATIONS

(71) Applicant: THE TICKET FAIRY, INC., San Francisco, CA (US)

(72) Inventors: Ritesh Patel, London (GB); Jigar Patel, London (GB)

(73) Assignee: THE TICKET FAIRY, INC., San Francisco, CA (US)

( * ) Notice: Subject to any disclaimer, the term of this patent is extended or adjusted under 35 U.S.C. 154(b) by 168 days.

(21) Appl. No.: 16/325,533

(22) PCT Filed: Aug. 11, 2017

(86) PCT No.: PCT/US2017/046425
§ 371 (c)(1),
(2) Date: Feb. 14, 2019

(87) PCT Pub. No.: WO2018/034954
PCT Pub. Date: Feb. 22, 2018

(65) Prior Publication Data
US 2019/0205920 A1 Jul. 4, 2019

Related U.S. Application Data

(60) Provisional application No. 62/374,877, filed on Aug. 14, 2016.

(51) Int. Cl.
*G06Q 30/02* (2012.01)
*G06Q 50/00* (2012.01)
(Continued)

(52) U.S. Cl.
CPC ......... *G06Q 30/0244* (2013.01); *G06Q 30/02* (2013.01); *G06Q 30/0214* (2013.01);
(Continued)

(58) Field of Classification Search
None
See application file for complete search history.

(56) References Cited

U.S. PATENT DOCUMENTS

| | | |
|---|---|---|
| 8,639,575 B2 | 1/2014 | Kiveris |
| 8,712,859 B2 | 4/2014 | Musrif |
| | (Continued) | |

FOREIGN PATENT DOCUMENTS

| | | |
|---|---|---|
| CN | 105431874 A | 3/2016 |
| WO | 2010022271 A2 | 2/2010 |
| | (Continued) | |

OTHER PUBLICATIONS

Zarantonello et al, "The impact of event marketing on brand equity: the mediating roles of brand experience and brand attitude" , 2013, International Journal of Advertising 32, No. 2, pp. 1-44 (Year: 2013).*

(Continued)

*Primary Examiner* — John Van Bramer
(74) *Attorney, Agent, or Firm* — Davin Chin; Chin IP, PLLC

(57) ABSTRACT

The present technology generally relates to metadata based generation and management of event presentations. The technology may include selecting a plurality of target audiences, programmatically generating a plurality of presentations and a presentation plan, programmatically executing the presentation plan, and programmatically adjusting the presentation plan based on monitored efficiency. The adjusting of the presentation plan may be based, for example, on performance of constituent elements of particular presentations relative to other constituent elements, e.g., from other presentations.

20 Claims, 9 Drawing Sheets

(51) Int. Cl.
   *H04L 29/06* (2006.01)
   *G06Q 30/06* (2012.01)
   *H04L 29/08* (2006.01)

(52) U.S. Cl.
   CPC ..... *G06Q 30/0269* (2013.01); *G06Q 30/0641* (2013.01); *G06Q 50/01* (2013.01); *H04L 63/102* (2013.01); *H04L 67/22* (2013.01)

(56) References Cited

U.S. PATENT DOCUMENTS

| | | |
|---|---|---|
| 2005/0270602 A1 | 12/2005 | Shibamiya et al. |
| 2007/0143185 A1 | 6/2007 | Harmon et al. |
| 2008/0097826 A1 | 4/2008 | Leach et al. |
| 2008/0147487 A1 | 6/2008 | Hirshberg |
| 2008/0215426 A1* | 9/2008 | Guldimann ............ G06Q 30/02 705/14.61 |
| 2009/0012847 A1* | 1/2009 | Brooks .............. G06Q 30/0201 705/14.41 |
| 2009/0319351 A1 | 12/2009 | Soza et al. |
| 2010/0241501 A1 | 9/2010 | Marshall |
| 2012/0029990 A1 | 2/2012 | Fisher |
| 2012/0054143 A1 | 3/2012 | Doig et al. |
| 2012/0066082 A1 | 3/2012 | Sadler |
| 2012/0271665 A1 | 10/2012 | Musrif |
| 2013/0096981 A1 | 4/2013 | Evans et al. |
| 2013/0117124 A1* | 5/2013 | Landers ............. G06Q 30/0241 705/14.61 |
| 2013/0325525 A1 | 12/2013 | Boyd, Jr. |
| 2014/0067501 A1 | 3/2014 | Rozenvasser |
| 2014/0074604 A1 | 3/2014 | Castillo et al. |
| 2014/0075466 A1 | 3/2014 | Zhao |
| 2014/0095599 A1 | 4/2014 | Engle |
| 2014/0278968 A1* | 9/2014 | Strompolos ........ G06Q 30/0249 705/14.52 |
| 2014/0337120 A1 | 11/2014 | Ercanbrack |
| 2015/0227967 A1 | 8/2015 | Knight et al. |
| 2015/0229995 A1 | 8/2015 | Haberman et al. |
| 2015/0288645 A1 | 10/2015 | Gianattasio et al. |
| 2016/0034936 A1 | 2/2016 | Bryant et al. |
| 2016/0071162 A1 | 3/2016 | Ogawa et al. |
| 2016/0134945 A1 | 5/2016 | Gower et al. |
| 2016/0253709 A1* | 9/2016 | Chen .................. G06Q 30/0261 705/14.58 |
| 2017/0103416 A1* | 4/2017 | Krishnan ........... G06Q 30/0254 |
| 2019/0230070 A1 | 7/2019 | Isaacson et al. |

FOREIGN PATENT DOCUMENTS

| | | |
|---|---|---|
| WO | 2014142758 A1 | 9/2014 |
| WO | 2016101043 A1 | 6/2016 |
| WO | 2018034953 A1 | 2/2018 |
| WO | 2018034954 A1 | 2/2018 |
| WO | 2018034956 A1 | 2/2018 |

OTHER PUBLICATIONS

International Search Report/Written Opinion dated Oct. 18, 2017 in PCT Application No. PCT/US2017/046428; 12 pages.
International Search Report/Written Opinion dated Oct. 19, 2017 in PCT Application No. PCT/US2017/046423; 9 pages.
International Search Report/Written Opinion dated Oct. 2017 in PCT Application No. PCT/US2017/046425; 7 pages.
Patel, Ritesh et al.; "Content Distribution Via Network of Computing Devices"; U.S. Appl. No. 16/325,527, filed Feb. 14, 2019; 33 pages.
Wicker, Pamela et al. "Estimating Consumer's Willingness-to-pay for Participation in and Traveling to Marathon Events", 2013, 13 pages.
Extended European Search Report dated Feb. 1, 2020 in EP Patent Application No. 17841902.4; 9 pages.
Extended European Search Report dated Dec. 4, 2019 in EP Patent Application No. 17841903.2; 10 pages.
Non-Final Office Action dated Jul. 10, 2020 in U.S. Appl. No. 16/325,527; 15 pages.
Yang K C et al: "Applying Social Marketing Theory to Develop Retargeting and Social Networking Advertising Website", 2015 IEEE International Conference on Industrialengineering and Engineering Management (Ieem), IEEE, Dec. 6, 2015 (Dec. 6, 2015), pp. 1845-1849.
Final Office Action dated Jan. 28, 2021 in U.S. Appl. No. 16/325,527; 18 pages.

* cited by examiner

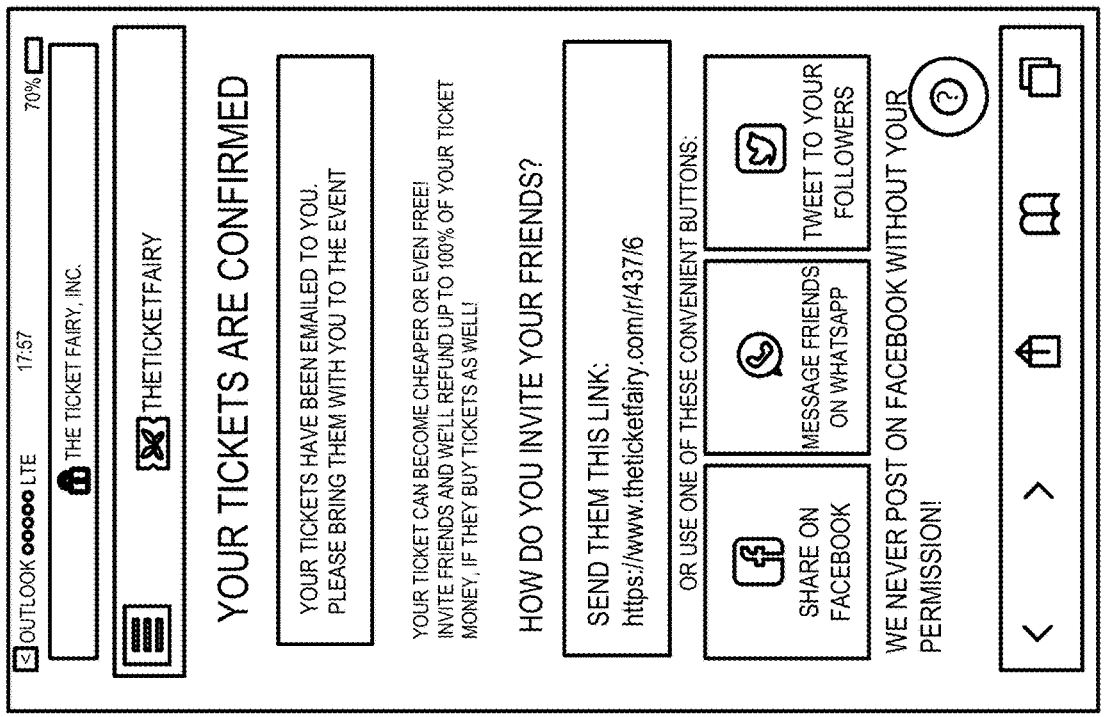
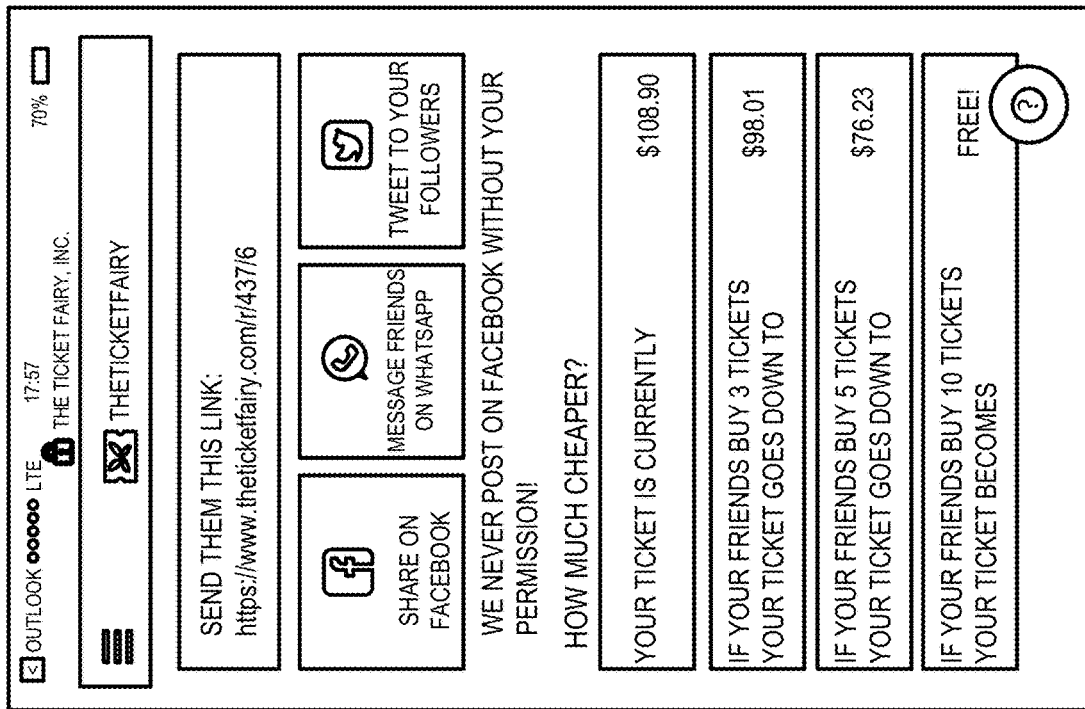
FIG. 4

THETICKETFAIRY

HELP ME   ABOUT   ACCOUNT   MY TICKETS   MANAGE EVENTS   LOG OUT

REFERRAL TIERS

| REFERRAL TARGET | REBATE PERCENTAGE |
|---|---|
| 4 TICKETS | 30% |
| 8 TICKETS | 65% |
| 12 TICKETS | 100% |

REFERRAL PERFORMANCE 14.1% OF YOUR TOTAL REVENUE HAS BEEN REFERRED BY TICKET BUYERS
THIS NZ$321,359.00 OF ADDITIONAL REVENUE WILL RESULT IN REBATES TO TICKET BUYERS OF NZ$9,087.06 (WHICH IS AN EFFECTIVE MARKETING COST OF 2.83%)
THIS ALSO MEANS THAT EVERY NZ$1 SPENT ON REBATES HAS RESULTED IN NZ$35.36 OF ADDITIONAL REVENUE.
THESE REBATES OF NZ$9,087.06 MAKE UP 0.40% OF YOUR TOTAL REVENUE.
447 OF YOUR 10933 TICKET BUYERS WERE RESPONSIBLE FOR GENERATING 14.1% OF YOUR TICKET REVENUE.

SALES REFERRED BY TICKET BUYERS

| CUSTOMER NAME | NO. OF SALES REFERRED | INCOME GENERATED (EXCL. FEES) | ORIGINAL PURCHASE PRICE (EXCL. FEES) | REFUND DUE |
|---|---|---|---|---|
| JOE | 13 | NZ$4445.00 | NZ$200.00 | NZ$200.00 |
| JOYCE | 12 | NZ$2717.00 | NZ$200.00 | NZ$200.00 |
| SAM | 12 | NZ$4249.00 | NZ$240.00 | NZ$240.00 |
| SALLY | 12 | NZ$3872.00 | NZ$200.00 | NZ$200.00 |
| A | 12 | NZ$2448.00 | NZ$200.00 | NZ$200.00 |
| B | 12 | NZ$3287.00 | NZ$200.00 | NZ$200.00 |
| C | 12 | NZ$3801.00 | NZ$200.00 | NZ$200.00 |
| D | 12 | NZ$2640.00 | NZ$200.00 | NZ$200.00 |
| E | 11 | NZ$3687.00 | NZ$255.00 | NZ$165.75 |
| F | 10 | NZ$1252.00 | NZ$106.25 | NZ$69.06 |

*FIG. 6*

METADATA BASED GENERATION AND MANAGEMENT OF EVENT PRESENTATIONS

CROSS-REFERENCE TO RELATED APPLICATION(S)

This application claims priority to and is a 35 U.S.C. § 371 national stage entry of International Application No. PCT/US2017/046425, which claims the benefit of U.S. Provisional Patent Application No. 62/374,877, filed Aug. 14, 2016. Each of the afore-referenced application(s) is hereby incorporated by reference.

BACKGROUND

A content item may be transmitted over a variety of channels and displayed to a user of a computing device via the Internet. The content item may be selected and presented to the user due to potential interest of the content item, or the channel, to the user. In addition, some content items may be selected for a particular channel based on information associated with the user. In some cases, presenters are able to customize when and how their presentations appear on a channel based on the use of cookies, unique identifiers of specific computers, to create an aggregation of data or behavioral targeting to increase a presenter's results for investment.

BRIEF DESCRIPTION OF THE DRAWINGS

Non-limiting and non-exhaustive embodiments of the present technology are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein:

FIG. 4 includes screenshots showing a user confirmation page from a mobile device according to aspects of the technology.

FIG. 6 includes a screenshot showing a referral leaderboard according to aspects of the technology.

DETAILED DESCRIPTION

Figure 1:
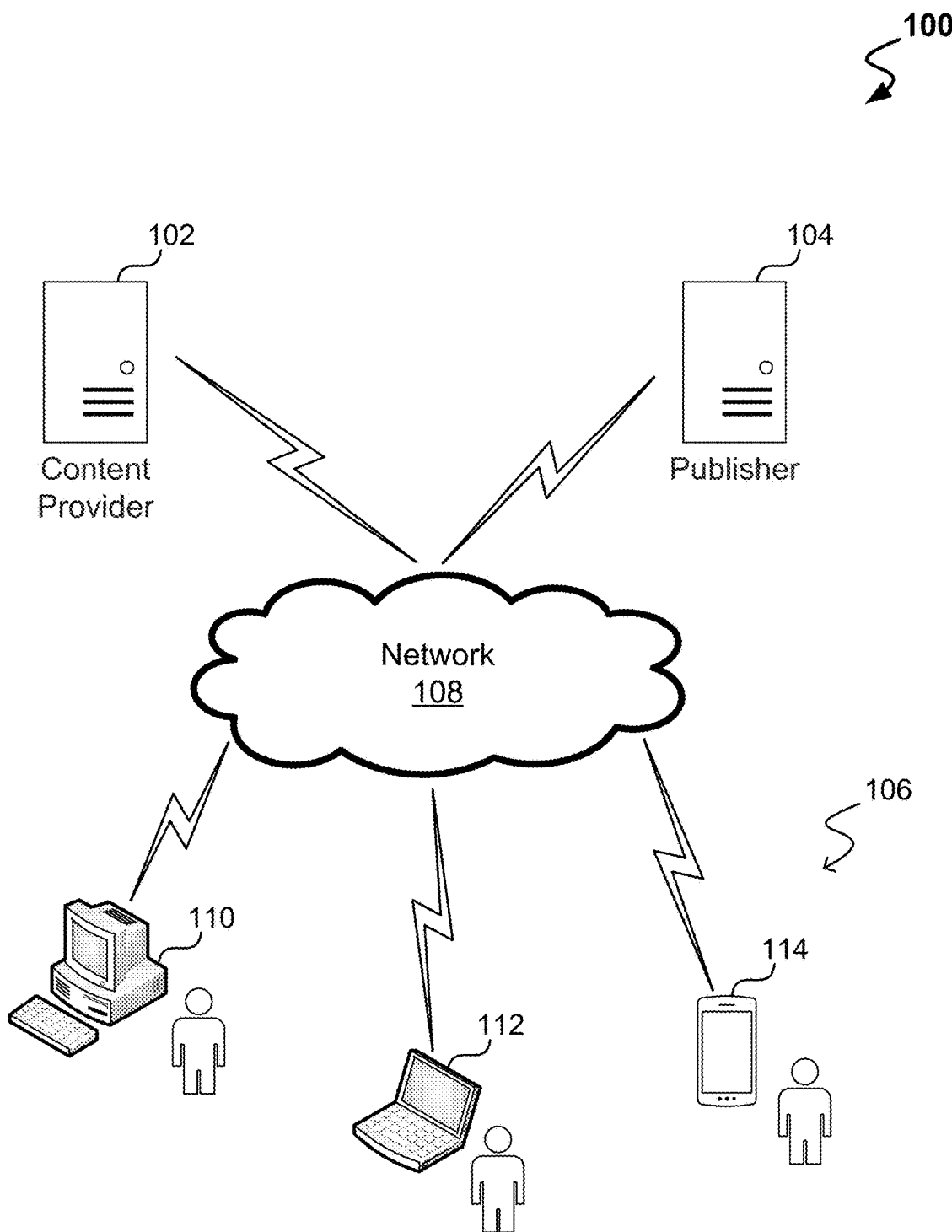
FIG. 1 is a diagram depicting an example networked computing environment in which the technology may be practiced.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

INTRODUCTION

The present technology generally relates to metadata based generation and management of event presentations. Such technology may include selecting a plurality of target audiences, programmatically generating a plurality of presentations and a presentation plan, programmatically executing the presentation plan, and programmatically adjusting the presentation plan based on monitored efficiency. The adjusting of the presentation plan may be based, for example, on performance of constituent elements of particular presentations relative to other constituent elements, e.g., from other presentations.

Aspects of the present technology also relate to content distribution via a network of computing devices. The technology may include presenting online content to users via computer networks, such as the Internet and, more particularly, to methods and systems for establishing relationships between users wherein these relationships are employed to deliver content to users based, e.g., on potential interest in events. The present technology may additionally or alternately be employed, for example, to increase the distribution of content via a network of computing devices, to select and/or manage the presentation of content over the network of computing devices, and to select targets for the presentation of content over the network of computing devices.

Further, aspects of the present technology also relate to automated target identification and management. The technology may include generating relationship tokens such as retargeting pixels according to user relationship records reflecting evaluations of whether particular users are in or likely to be in a target demographic. The technology also includes transmission of the relationship tokens to computing devices associated with the particular users and receiving a request from a content producer to present content to users. Using the relationship tokens, a target audience can be determined, and content presented thereto, on behalf of the content producer.

Illustrative Operating Environments/Devices

FIG. 1 is a diagram depicting an example networked computing environment 100 in which aspects of the technology may be practiced. With reference to FIG. 1, an example networked computing environment 100 may include a content provider 102, one or more publishers 104, and one or more user computing devices 106. Content provider 102, the one or more publishers 104, and the one or more user computing devices 106 may be coupled via a network 108. The content provider 102, the one or more publishers 104, and the one or more user computing devices 106 may each include virtually any type of general- or specific-purpose computing device. For example, these computing devices may be user devices such as desktop computers, laptop computers, tablet computers, display devices, cameras, printers, or smartphones, such as illustrated and discussed in conjunction with FIG. 2. In the example embodiment, content provider 102 provides content for presentation to users. Content provider 102 may also select and/or manage the presentation of content, and/or over the network of computing devices, and to targets for the presentation of content.

In one implementation, content items are supplied by the content provider and are delivered for display on the user computing devices 106. A content provider 102 may directly or indirectly generate, maintain and/or analyze content, which may be related to products or services, including events, offered by or otherwise associated with the content provider 102. The content provider 102 may include or maintain one or more processes that run on one or more data processing systems.

In one implementation, a content provider 102 may execute a platform, or a system that can be programmed and therefore customized. In some examples, a plug-in application program interface ("API") may be used in the platform to allow developers to build new functions that can be injected or "plugged-in" to the system.

The publishers 104 may include any entities that generate, maintain, provide, present and/or otherwise place content into the environment 100. "Publishers," in particular, include authors of publications, wherein authors may be individual persons, or, in the case of works made for hire, the proprietor who hired the individual responsible for creating the online publications. The term "content" refers to various types of presented information, including web-based, software application-based and/or other information that may be presented to a user using a computing device such as one of user computing devices 106.

Content may be communicated via various mediums and in various forms. In some examples, content may be communicated through an interactive medium, such as the Internet, and may include graphical content (e.g., banner content), textual content, image content, audio content, video content, content combining one or more of any of such components, or any form of electronically delivered content. Content may include embedded information, such as embedded media, links, meta-information, and/or machine executable instructions, including sharable links, unique buttons, retargeting pixels. As merely one example, the content may include information regarding an event, such as an event of potential interest to a user of one of the computing devices 106.

Figure 2:
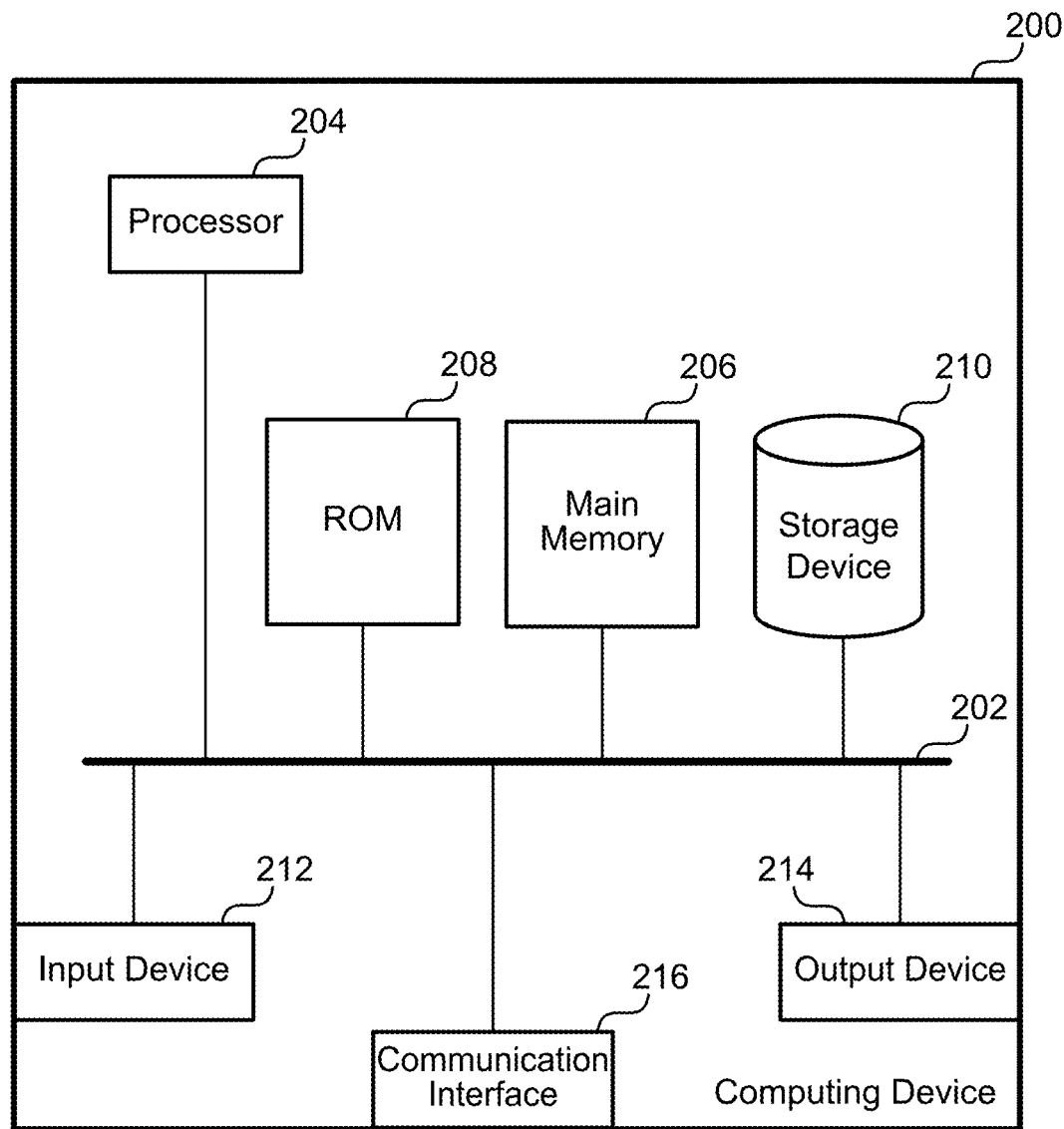
FIG. 2 is a block diagram of an example computing device in which the technology may be practiced.

FIG. 2 is a block diagram of an example computing device 200 in which the technology may be practiced. FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed here.

In one implementation, computing device 200 could be user computing devices 106 or any data processing device associated with content provider 102 or publishers 104 (shown in FIG. 1). Computing device 200 may include a bus 202, a processor 204, a main memory 206, a read only memory (ROM) 208, a storage device 210, an input device 212, and output device 214, and a communication interface 216. Bus 202 may include a path that permits communication among the components of computing device 200.

Processor 204 may include any type of processor, microprocessor, or processing logic that interprets and executes instructions. Processor 204 can process instructions for execution within the computing device 200, including instructions stored in the memory 206 or on the storage device 210 to display graphical information for a GUI on an external input/output device such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable storage medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable storage medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The information carrier is a computer- or machine-readable storage medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In some implementations, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communication with another device or system via a network, such as network 108 (shown in FIG. 1).

As described herein, computing device 200 facilitates the presentation of content to a user. Computing device 200 may perform these and other operations in response to processor 204 executing software instructions contained in a computer-readable medium, such as memory 206. A computer-readable storage medium may be defined as a physical or logical memory device. The software instructions may be read into memory 206 from another computer-readable storage medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software. Despite the above-discussion, the terms computer-readable storage medium and machine-readable storage medium specifically do not include or encompass communications media, any communications medium, or any signals per se.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Figure 3:
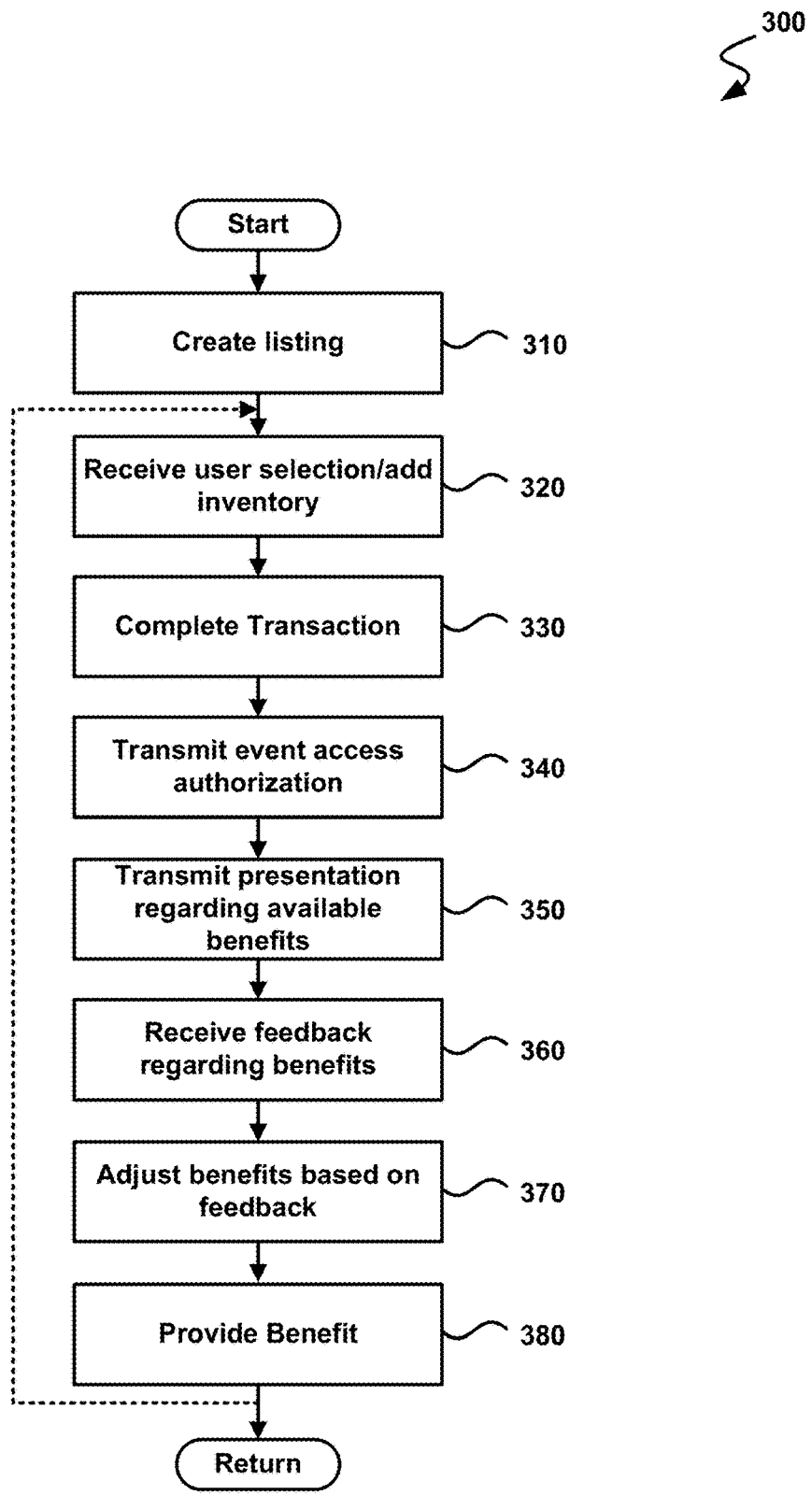
FIG. 3 is a logical flow diagram illustrating a process for increasing the distribution of content via a network of computing devices.

FIG. 3 is a logical flow diagram illustrating process 300 for increasing the distribution of content via a network of computing devices. Process 300 may also include establishing relationships between online users through the use of referrals. Process 300 begins at 310 where listings are generated or otherwise created. As one example, a listing, may include an offer of admission to an event. As an additional example, a listing includes, is part of, or is associated with a page on a content provider's website enumerating a plurality of events of potential interest to a user. The listing and/or the page may also include details for such events. Examples of events include concerts, comedy shows, theatrical presentations, operas, movies, educational presentations, festivals, transportation, sporting events, competitive video game events, other video events, eSports tournaments, and/or the like.

As one example, 310 includes creating a page on a presenter's website listing details on available tickets for an upcoming event. As an additional example, the organizer of the event may drive online traffic to the presenter's website in an effort to attract users. However, a listing may be created in this or any other suitable way. At 310, either a single listing may be created, or multiple listings, e.g., either for a single event, or for each of multiple events may be created.

Processing continues at 320 where the user's selection is received. For example, the content provider may receive an indication that the user has requested a specified number of admissions to a particular event. Receiving the user's selection may also or alternately include receiving an indication that an event was selected, by the user, from amongst the multiple events. Such an indication may be received in response to a user's interaction with the content provider 102's website. In response, the requested number of admissions is added to a shopping cart for the user.

Processing then flows to 330 where a transaction is completed. For example, completion of the transaction may include receiving compensation from the user in exchange for the requested admission(s). As one example, 330 may include a check-out process in which the user provides compensation details, agrees to terms and/or conditions for the event, confirms interest in the event, provides details regarding the user and/or other attendees, and/or the like.

Processing then continues to 340 where an event access authorization is transmitted, for example, by content provider 102 to a user computing device 106. As one example, the event access authorization may comprise an access code, access information, event information, a print-at-home ticket, an E-ticket, and/or the like. These and other examples of event access authorizations may be transmitted over a website, via email, or in any other suitable way. Additionally, or alternatively, the event access authorization may include a physical token, a hard-copy ticket, or the like. In these examples, the event access authorization may be transmitted via mail, via a courier service, and/or the like.

Processing continues at 350 where a presentation is transmitted regarding available benefits, for example, by content provider 102 to a user computing device 106. As one example, the available benefits may relate to the event, and may be transmitted as a list of benefits. The available benefits may include different type of benefits. For example, the benefits may include a discount for the already obtained event access authorization (e.g., via a reversal of a portion or all of the compensation). In some examples, the benefit may be unrelated to the compensation. For example, the benefit could include enhanced access to the event, e.g., a backstage pass or a meet and greet with a band. In other examples, the benefit may be a credit usable towards items at the event, such as drinks or merchandise. Further, the benefits may be unrelated to the event. For example, the benefit may include a discount or entry to a different event, and/or the like.

Figure 5:
FIG. 5 includes a screenshots showing another user confirmation page according to aspects of the technology.

As one example, 350 includes content provider 102 presenting a confirmation page to user computing device 102 offering the one or more benefits in return for a successful referral to the event. Further, the presentation may include a mechanism for electronically sharing a presentation relating to the event to others, e.g., via social media. As one example, the presentation may include a unique link or button that the user can select to electronically "post" the presentation to their social network. Moreover, such link or button may include information to facilitate tracking, e.g., by content producer 102, of the posting and/or resulting referrals. As additional examples, as shown in FIGS. 4 and 5, social media channels used by the first content user may include Facebook and Twitter. Other social media channels used by the first content user may include Foursquare, Instagram and LinkedIn, WhatsApp, Google+, and/or the like.

In one example, the presentation includes targets for the number of successful referrals required for a benefit. In various implementations, e.g., as shown in FIGS. 4 and 5, information is displayed on the confirmation page regarding tiered number of successful referrals required for benefits such as a percentage reduction of the compensation exchanged for the event access authorization. Such reduction, if earned, may be refunded to a user's original form of compensation by employing a stored transaction ID. In other examples, the number of referrals (or successful referrals) for a benefit may be a linear target, giving a fixed benefit per referral (or successful referral). Other examples, benefits may be provided in non-linear, e.g., tiered levels. For example, a larger benefit, benefit percentage, or the like, could be provided per referral once a user reaches a threshold number of referrals.

Figure 7:
FIG. 7 includes a screenshot showing a referral statistics according to aspects of the technology.

In one example, the presentation includes a leaderboard, listing the users with the highest number of referrals. In one implementation, e.g., as shown in FIG. 6, the presentation includes a referral target corresponding to a rebate percentage and a corresponding list of users who have referred the highest number successful referrals along with the benefit due to the user in an effort to incentivize referrals. Alternately, a leader board illustrating a total number of referrals or other metric(s) could be provided. In another example, the presentation includes a summary page, including, for example, event information and associated referral statistics or other metrics. For example, as shown in FIG. 7, the presentation includes an identification of a particular event, benefit information, and/or metrics relating to referrals for that event. For example, the presentation of FIGS. 6 and/or 7 may be provided to a producer of the event. Information such as illustrated in FIGS. 6 and 7, and/or employed in generating FIGS. 6 and/or 7 may be provided to an event producer or another party via an API. For example, information such as user information including location (e.g., city, state, province, country), contact information (e.g., email address, phone number, address, social media username/identifier, referrer identifier), name (e.g., first name, last name), ticket purchase information (e.g., original cost, original price), referral metrics (e.g., revenue generated, sales referred, refund due), etc. The entirety of such information, or any subset thereof may be provided, retrieved, searched, or otherwise obtained by an event producer of other party via an API. Also, the event producer or other party could utilize information received via the API to visualize the returned information, e.g., in their own reports, or via publication such as on a public website. For example, publication on a public website could be employed to enable users to view their own referral metrics (e.g., in comparison to other users) and to foster "competition" between users. The event producer or other party could also use information received via the API to offer particular benefits to referrers, e.g., "top" referrers, such as a backstage pass, a meet and greet with a band, merchandise, a ticket upgrade, and/or the like.

Further, differing targets of successful referrals required for a given benefit may be tested, and the target values selected based on the number successful referrals received for each of the differing targets, based on an association between benefit values and referrals, based on engagement of users to "post" to their social networks, etc. In an additional example, higher referral targets may be initially tested in a specific demographic, and later modified based on the number of successful referrals, total referrals, user engagement, etc. In some implementations, differing target values may be set slightly higher for an event based on the type of event, or based on the remaining inventory/capacity for the event. In some examples, the targets may be selected to improve the return on results to the event sponsor.

Processing continues at 360 where feedback is received regarding benefits. Such feedback may include, for example, indications of the number of successful referrals, total referrals, user engagement, etc. However, other feedback may also be employed. Processing continues to 370 where benefits are adjusted based on feedback. In one example, benefit targets are selected based on ticket value and previous share engagement to achieve the lowest budget per conversion. In some examples, the share rates and conversion rates for a given benefit target are measured and tracked, allowing for the adjustment of targets for a particular benefit to achieve the lowest budget per conversion. In some implementations, mathematical testing techniques such as A/B testing or multi armed bandit testing, or the use of machine learning technologies such as IBM's Watson or deeplearning4j to feed data on the different targets or percentages being tested may be used.

Further, for example, a platform may be adapted for automatic optimization. For example, a platform may split test engagement for different sets of referral targets/rebate percentages based on the ticket price and previous share engagement for events with similar demographics and/or ticket values. Further, confirmation pages for a particular event may dynamically vary over time, e.g., such that they present dynamically varied targets/percentages to the first n % of ticket buyers. Based on measured share/"posting" and/or conversion rates, benefits may be dynamically selected based on combinations of targets/percentages that achieve the best conversion rates/lowest budget per conversion. Further, a dynamically determined combination may be employed for the following (100–n) % of event access authorizations. In these and other ways, different benefits and/or different referral targets may be provided to different users. For example, referral targets may be dynamically adjusted based on feedback received from at least one other remote computing device associated with at least one other user regarding referral targets previously transmitted to the at least one other remote computing device.

Process 300 may then flow to 380 where the benefit is provided to a user. For example, a user who referral(s) have reached a particular number may be presented with the option of selecting from benefits from the list of benefits that correspond to the particular number, and such benefit may be provided to the user. For example, the system may receive an indication of a referral made in response to the transmitting, to the user's computing device, the list of benefits associated with referrals for the event and referral targets, receive an indication that a benefit was selected, by the user, from the list of benefits, and transmit, to the user's computing device, an indication the selected benefit is being provided (e.g., an access code, access information, event information, a print-at-home ticket, an E-ticket, and/or the like for the benefit). Additionally, or alternatively, a benefit may be automatically selected and/or provided to a user. For example, the system may receive an indication of a referral being made, and initiate a return of at least a portion of compensation provided by the user for access to the selected event. These and other variations are possible.

From 380, processing may return to other actions. Optionally and alternatively, processing may continue at 320, or any other step of process 300, e.g., if further transactions, adjustments, presentations, etc. are to be processed.

Figure 8:
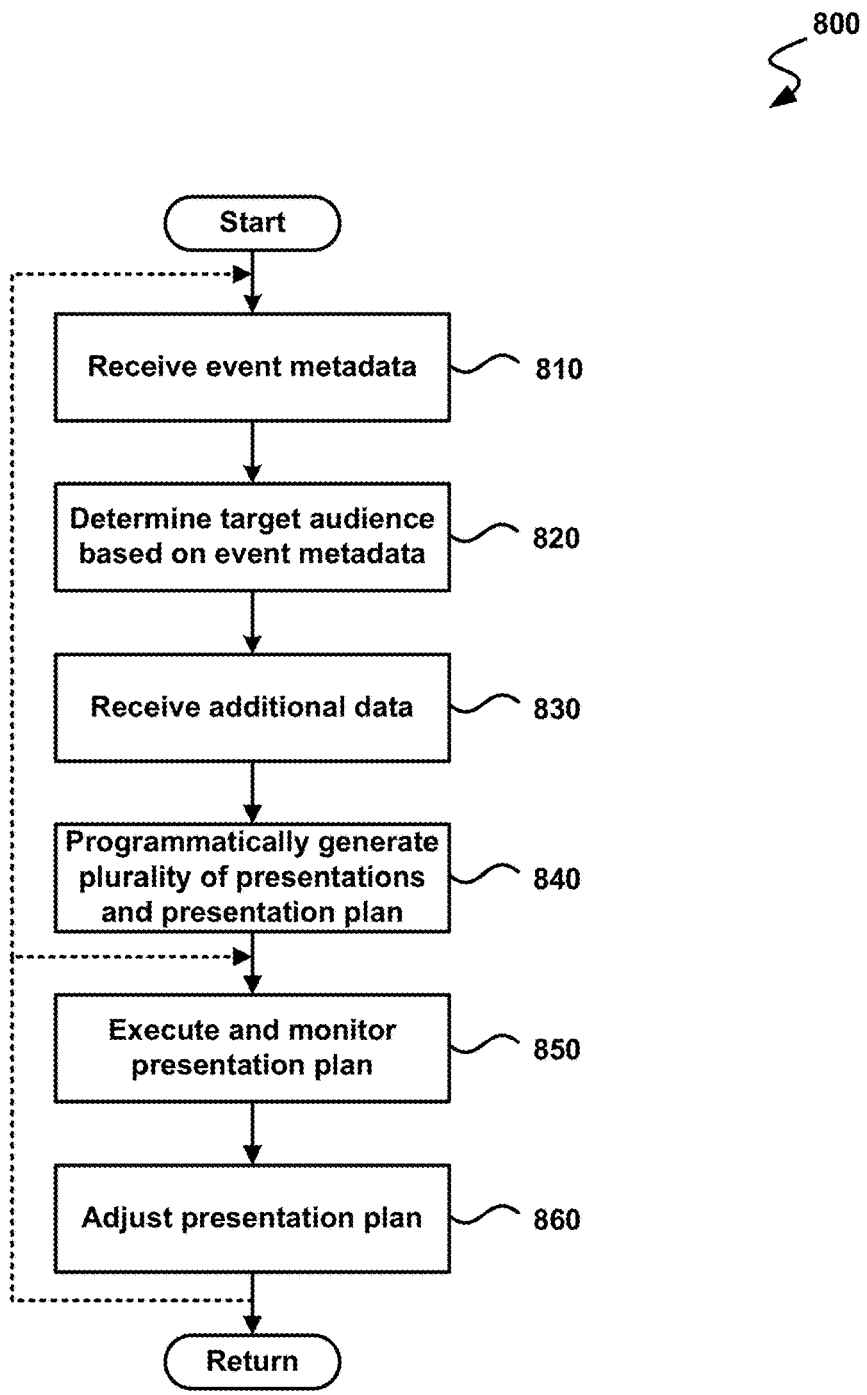
FIG. 8 is a logical flow diagram illustrating a process for selecting and managing the presentation of content over the network of computing devices.

FIG. 8 is logical flow diagram illustrating process 800 for selecting and managing the presentation of content over the network of computing devices. Process 800 begins at 810 where event metadata is received. In one implementation, structured event metadata, such as date, location, performers, event type, event size, and ticket value, are received in an effort to determine a target audience for an event. However, event metadata may be received in this or any other suitable way.

Processing continues to 820 where a target audience is determined based on the event metadata. In some implementations, structural metadata is employed to find resources by relevant criteria, identifying resources, bringing similar resources together, and distinguishing dissimilar resources. In some examples, the target audience will be determined by reference to social media. In one example, event metadata, such as a music type for the event, may be used to search for Facebook users who have been fans of the music type. Such users may then be added to a target audience list. In other examples, event metadata, such as age range may be used to search Facebook for users who are of the same age range as the age range of past event attendees.

Processing then flows to 830 where additional data is received. In one implementation, the target audience is refined based on the use of external APIs to obtain information relating to the event. In some examples, external APIs are used to find creative content such as images, biographies and genres related to an event or performer.

Processing continues to 840 where a plurality of presentations and a presentation plan is programmatically generated. In one implementation, multiple presentations are created which are combinations or other variations of the content used for the particular presentations, e.g., graphics, images, text, etc., and are set to be shown to various combinations or variations of audiences and/or timeframes, e.g., until the time that online ticketing for the event has closed. In some examples, one or more presentation plans are created for various social media platforms per performer, assigning a portion of the event's total promotion budget to particular platforms and individual presentations of the presentation plan. For example, a presentation plan may specify various combinations of particular presentation(s), target audience(s), media platform(s) on which presentations are to be deployed, and/or time-frames along with budgets for the various combinations. Alternately or additionally, the presentation plan may reflect differences for different combinations of portions of the target audience, time-frames, and presentations, 840 may include generating different presentations for subsets of the of the target audience, generating differences in the preset plan, and/or the like.

Processing then flows to 850 where presentation plan is executed and monitored. In one implementation, the click through, engagement, conversion other rates, or other metric (s) are monitored for each of the particular platforms and/or individual presentations. The processing at 850 may also include correlating the various conversion metrics such as click-through rate, purchase rate, user referral rate, and/or the like, with the individual elements that make up that particular presentation. For example, these and other metrics may be correlated to the individual content items, selected target audiences, selected media platforms, time-frames, and/or the like.

Processing then continues to 860 where the presentation plan is adjusted. In one implementation, based on the monitoring and/or determined performance for various particular platforms, portions of the target audience, and presentations, the platforms and/or presentations that are not resulting in a desired threshold of conversions are disabled and more of the budget is shifted to remaining presentations, e.g., presentations with higher performing metric(s). Thresholds, for example, may be based on a fixed threshold, thresholds for particular presentations may be relative to performance for other presentations, etc. Moreover, the target audience may be adjusted, e.g., to shift budget from portions of the target audience that are not resulting in sufficient conversions to other portions of the target audience. In some examples, presentations are continuously tested and budgets are optimized based on dynamically determined metric(s).

For example, budget may be shifted to presentations that are composed of or for more elements with higher correlated metrics than those with lower metrics, are composed from or for elements with lower correlated metrics, are composed from or for a number of elements with correlated metrics that are above a threshold value, and/or the like. Further, budget may also be shifted to additional presentations/ presentation plans, for example, to keep presentations "fresh" and/or avoid user desensitization to presentations. These additional presentation plans may be either generated at 840 and "saved" for later use, or may be generated at a later time.

From 860, processing may return to other actions. Optionally and alternatively, processing may continue at 850, 810, or any other step of process 800, e.g., if adjustments are to be made to the presentation plan, additional presentations are to be generated, and/or the like.

Figure 9:
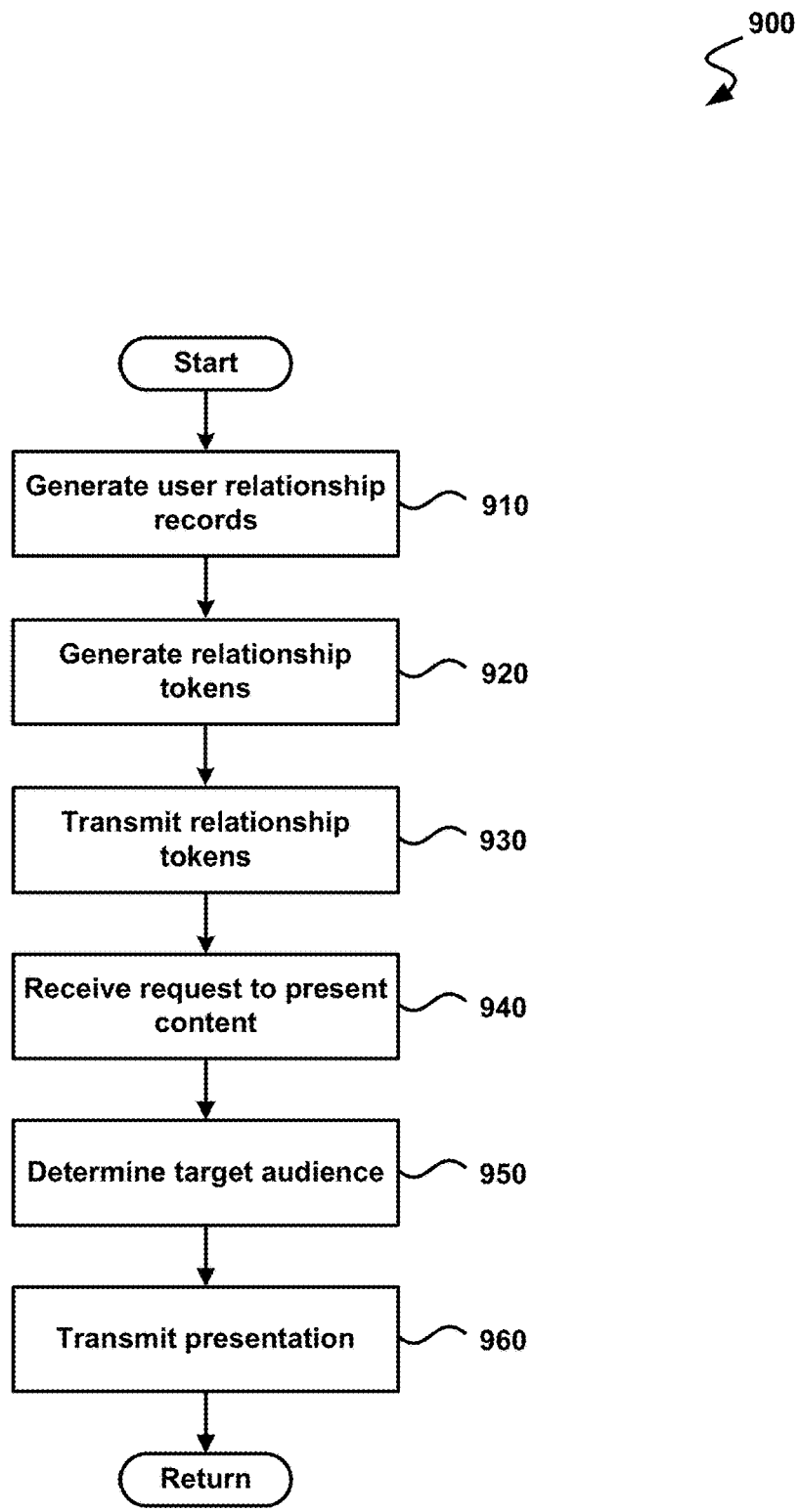
FIG. 9 is a logical flow diagram illustrating a process for selecting targets for the presentation of content over the network of computing devices.

FIG. 9 is a logical flow diagram illustrating process 900 for selecting targets for the presentation of content over the network of computing devices. Process 900 begins at 910 where user relationship records are generated or otherwise obtained for users of a plurality of users. In one implementation, the user relationship records for each of the plurality of users is generated on the computing device. However, they may be received from another party, e.g., via an API, in other examples.

In one implementation, a record of past user interactions with the content provider 102, including event metadata and user profiles is analyzed in generating relationship record(s). In some examples, such records may include indicia indicative of whether particular users are associated with a higher than average likelihood of willingness to pay to attend an event, pay for travel for the event, and/or the like. For example, such records may include lifestyle and social interests of the user, whether the user previously traveled to one or more events of a particular type (e.g., a same or similar type as an event associated with the presentation of 940), and/or the like. Such records may also be obtained from a social media platform, e.g., via an API call, or generated locally based, for example, on past events of interest to the user. Further, users who obtained entry to past events may be considered, for example, "high value" users, e.g., due to demonstrated willingness to exchange compensation for an event access authorization. Additionally, users who traveled to an event, paid for travel to an event, or who demonstrate willingness to travel to an event, may also be employed as an indicia of a "high value" status. As one example, a determination of willingness to travel may be based on a comparison of a user's billing or other address to the location of an event for which a user obtained an event access authorization. Also, "high value" status may also be associated with an ability of a user to influence others. For example, the user relationship records may include indicia indicative of a size of the social networks of users, indicia indicative of an extent of influence of users on other users in their social network, and/or the like.

Processing then continues to 920 where relationship tokens are generated, e.g., in accordance with the relationship record obtained at 910. For example, such tokens may indicate that a particular user a "high value" user for particular type(s) of events, e.g., by genre, time, venue, performer, theme, content, and/or the like. In some implementations, retargeting pixels are employed as relationship tokens.

Processing then continues to 930 where the generated relationship tokens are transmitted to a user computing device. For example, transmitting the relationship tokens may include transmitting the relationship token to a user's browser as part of a checkout process, e.g., for a different/prior event. The retargeting pixels, or other relationship tokens, may also be attached to the user profile with the content provider. In some examples, the user is added to a custom audience list, such as Facebook custom audiences or Google custom audiences based, for example, on a ruleset for generating a custom audience.

Processing then flows to 940 where a request is received to present content. In some example, the request is received from a content provider via a self-service platform for parties interested in reaching the content provider's "high value" audience. As one example, the self-service platform may enable the content provider to create, manage, and execute presentation campaigns targeted to the "high value" audience. The self-service platform may also provide an ability for the content provider to indicate/select the type of audience they want to reach or specify a particular event whose audience they want to reach. Alternately or additionally, content provider 102 may automatically or otherwise deploy and/or manage presentation campaigns on the behalf of other parties. In one implementation, the content provider is independent from an operator of the self-service platform.

In some examples, the request may be to present presentations to a specific type or set of users, the set or type of users determined by the relationship record. As one example, a request may be a request to present content for a specific event. In some implementations, the request to present content may include a presentation from the content publisher. However, the request to present content may additionally or alternatively be a request to generate presentation(s) and/or presentation plan(s), e.g., via the technology discussed in conjunction with FIG. 8.

Processing then continues to 950 where the target audience is determined. In some implementations, the target audience is determined by reviewing existing user relationship records and creating a sub-set of relationship records based on input from the content provider. Additionally or alternately, determination of the target audience may also incorporate technology such as discussed above in conjunction with 810 and 820 of FIG. 8.

Processing then flows to 960 where the presentation is transmitted, e.g., to the determined target audience. 960 may also include technology for generating presentation plan(s), adjusting presentation(s) and/or presentation plan(s), and/or the like. For example, 960 may include examples of the technology described above in conjunction with FIG. 8. The content provider may also receive compensation from the external content provider for generating the audience, providing presentations, enabling contact with the audience, etc. As a more specific example, the content provider 104 may receive a premium on wholesale network expenses for delivering the presentations, on the premise that the targeted audience is of a higher value than the external content provider would otherwise be able to access. Thus the external content provider's results for investment may be higher than with other audiences. Compensation may also be shared with an organizer of an event from which the relationship record was generated.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A computing device, comprising:
at least one processor; and
at least one memory, wherein the at least one processor and the at least one memory are respectively configured to store and execute instructions, including instructions for causing the computing device to perform operations, the operations including:
receiving metadata relating to an event;
based on the received metadata, selecting a plurality of target audiences for one or more presentations for the event;
receiving additional metadata, the additional metadata being received via a programmatic interface to the computer device, and the additional metadata relating to at least one of a time, venue, performer, theme, or content associated with the event;

programmatically generating a plurality of presentations for the event, and a presentation plan for the event, the presentation plan specifying multiple combinations of particular presentations, time-frames for the presentations, and media platforms on which the particular presentations are to be deployed;

programmatically executing the presentation plan, including deploying the plurality of presentations;

programmatically monitoring efficiency of the deployed presentations, the efficiency being characterized by values for at least one metric for individual presentations of the plurality of presentations; and programmatically adjusting the presentation plan based on the monitored efficiency.

2. The computing device of claim 1, wherein the generating of the plurality of presentations for the event comprises:

selecting combinations of presentation elements for individual presentations based on the received additional metadata.

3. The computing device of claim 1, wherein the programmatically monitoring of the efficiency of the deployed presentations includes:

correlating the values for the at least one metric with individual presentations of the plurality of presentation.

4. The computing device of claim 1, wherein the programmatically monitoring of the efficiency of the deployed presentations includes:

correlating the values for the at least one metric with individual presentation elements from which the individual presentations of the plurality of presentation are composed.

5. The computing device of claim 1, wherein the programmatically monitoring of the efficiency of the deployed presentations includes:

correlating the values for the at least one metric with particular target audiences from the selected plurality of target audiences.

6. The computing device of claim 1, wherein the presentation plan also specifies the target audience for which the particular presentations are to be deployed for.

7. The computing device of claim 1, wherein the values for the at least one metric include at least one of a click-through rate, a purchase rate, or a user referral rate.

8. The computing device of claim 1, wherein the adjusting the presentation plan based on the monitored efficiency includes:

decreasing use of a presentation of the plurality of presentations that is associated with a value of the at least one metric that is lower than that for another presentation of the plurality of presentations.

9. The computing device of claim 1, wherein the adjusting the presentation plan based on the monitored efficiency includes:

increasing use of a presentation of the plurality of presentations that is associated with a value of the at least one metric that is higher than that for another presentation of the plurality of presentations.

10. The computing device of claim 1, wherein the adjusting the presentation plan based on the monitored efficiency includes:

increasing use of a presentation of the plurality of presentations that is composed from presentation elements that are associated with values of the at least one metric that is higher than those for other presentation elements.

11. The computing device of claim 1, wherein the adjusting the presentation plan based on the monitored efficiency includes:

increasing use of a presentation of the plurality of presentations that is composed from a plurality of presentation elements that are associated with values of the at least one metric that is above a threshold value.

12. A computer-implemented method, comprising:

receiving metadata relating to an event;

based on the received metadata, selecting a plurality of target audiences for one or more presentations for the event;

receiving additional metadata, the additional metadata being received via a programmatic interface to the computer device, and the additional metadata relating to at least one of a time, venue, performer, theme, or content associated with the event;

programmatically generating a plurality of presentations for the event, and a presentation plan for the event, the presentation plan specifying multiple combinations of particular presentations, time-frames for the presentations, and media platforms on which the particular presentations are to be deployed;

programmatically executing the presentation plan, including deploying the plurality of presentations;

programmatically monitoring efficiency of the deployed presentations, the efficiency being characterized by values for at least one metric for individual presentations of the plurality of presentations; and programmatically adjusting the presentation plan based on the monitored efficiency.

13. The method of claim 12, wherein the programmatically monitoring of the efficiency of the deployed presentations includes:

correlating the values for the at least one metric with individual presentation elements from which the individual presentations of the plurality of presentation are composed.

14. The method of claim 12, wherein the programmatically monitoring of the efficiency of the deployed presentations includes:

correlating the values for the at least one metric with particular target audiences from the selected plurality of target audiences.

15. The method of claim 12, wherein the adjusting the presentation plan based on the monitored efficiency includes:

increasing use of a presentation of the plurality of presentations that is composed from presentation elements that are associated with values of the at least one metric that is higher than those for other presentation elements; and decreasing use of another presentation of the plurality of presentations that is composed from the other presentation elements.

16. The method of claim 12, wherein the adjusting the presentation plan based on the monitored efficiency includes:

increasing use of a presentation of the plurality of presentations that is composed from a plurality of presentation elements that are associated with values of the at least one metric that is above a threshold value.

17. A computer-readable storage medium, having computer-executable instructions stored therein, the computer-executable instructions for causing a computing device to perform operations, the operations comprising:

receiving metadata relating to an event;

based on the received metadata, selecting a plurality of target audiences for one or more presentations for the event;

receiving additional metadata, the additional metadata being received via a programmatic interface to the computer device, and the additional metadata relating to at least one of a time, venue, performer, theme, or content associated with the event;

programmatically generating a plurality of presentations for the event, and a presentation plan for the event, the presentation plan specifying multiple combinations of particular presentations, time-frames for the presentations, and media platforms on which the particular presentations are to be deployed;

programmatically executing the presentation plan, including deploying the plurality of presentations;

programmatically monitoring efficiency of the deployed presentations, the efficiency being characterized by values for at least one metric for individual presentations of the plurality of presentations; and programmatically adjusting the presentation plan based on the monitored efficiency.

18. The computer-readable storage medium of claim 17, wherein the programmatically monitoring of the efficiency of the deployed presentations includes:
   correlating the values for the at least one metric with individual presentation elements from which the individual presentations of the plurality of presentation are composed.

19. The computer-readable storage medium of claim 17, wherein the programmatically monitoring of the efficiency of the deployed presentations includes:
   correlating the values for the at least one metric with particular target audiences from the selected plurality of target audiences.

20. The computer-readable storage medium of claim 17, wherein the adjusting the presentation plan based on the monitored efficiency includes:
   increasing use of a presentation of the plurality of presentations that is composed from presentation elements that are associated with values of the at least one metric that is higher than those for other presentation elements; and
   decreasing use of another presentation of the plurality of presentations that is composed from the other presentation elements.

* * * * *